April 7, 1942.  A. DUSKES  2,279,022
MOTION PICTURE APPARATUS
Filed Jan. 8, 1940  4 Sheets-Sheet 1
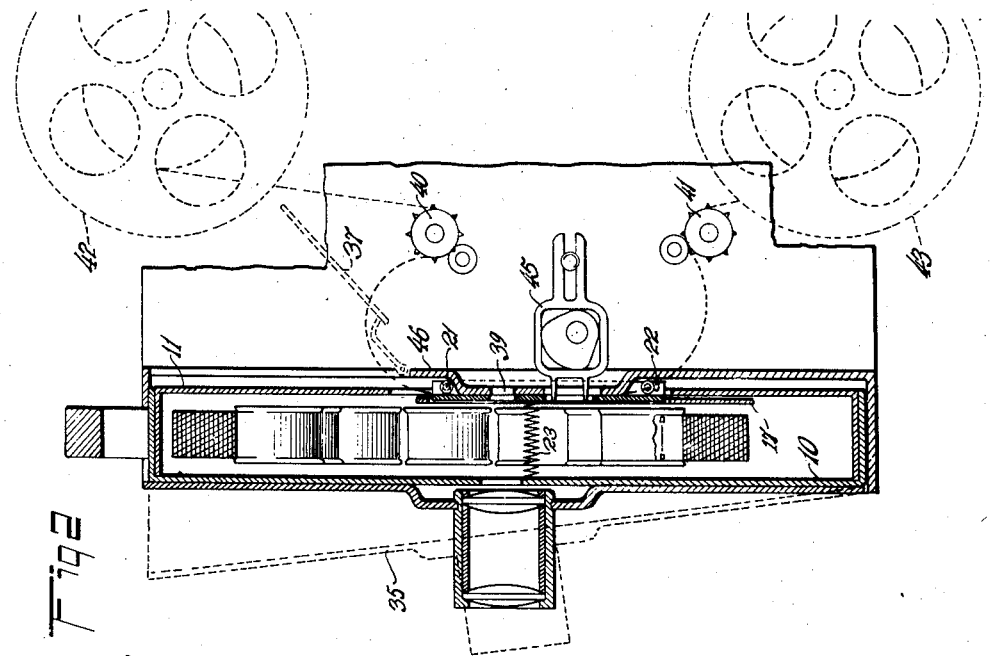
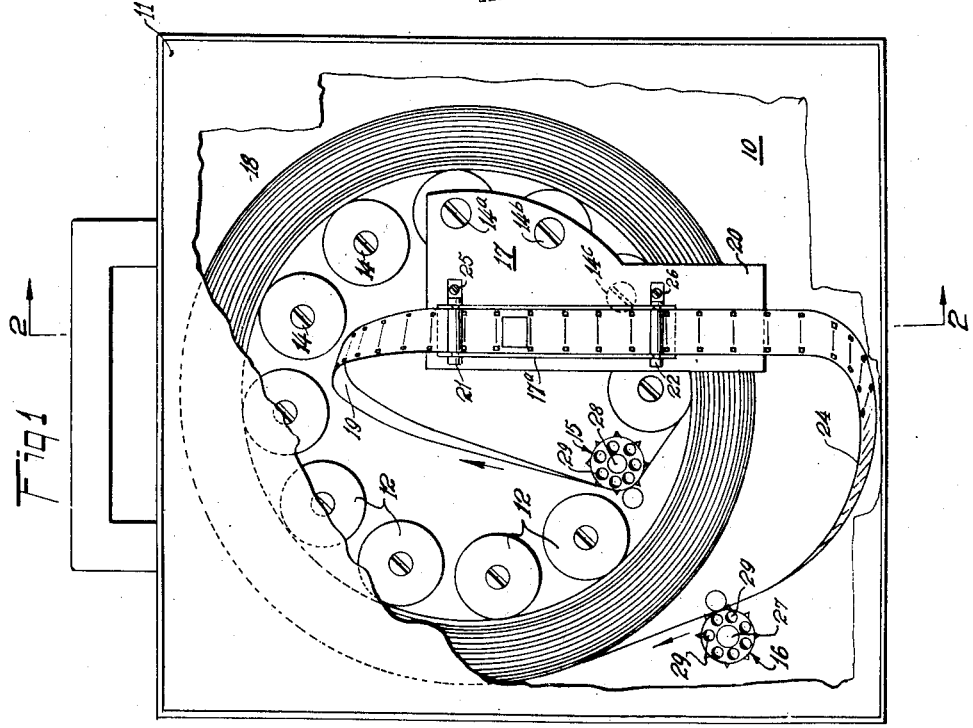
Alfred Duskes INVENTOR.

April 7, 1942. A. DUSKES 2,279,022
MOTION PICTURE APPARATUS
Filed Jan. 8, 1940 4 Sheets-Sheet 2
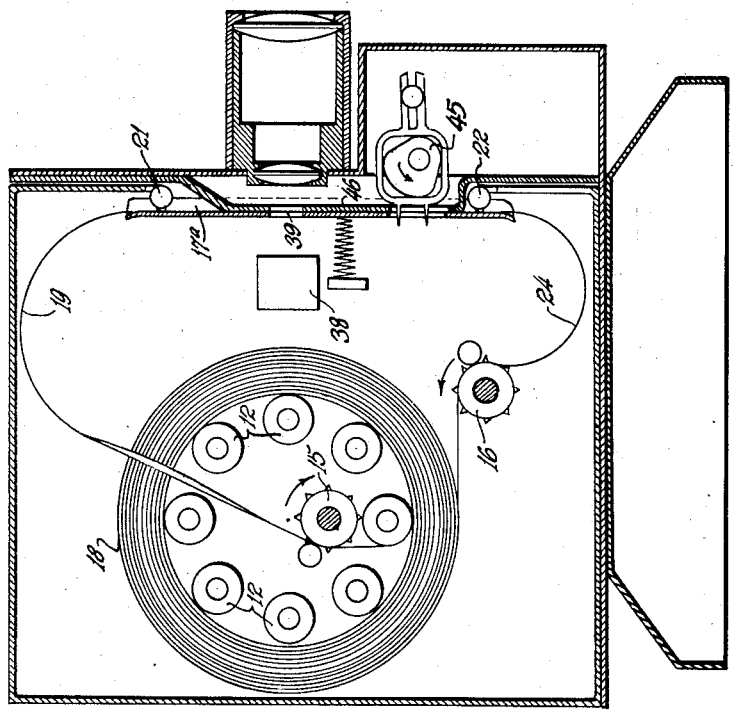
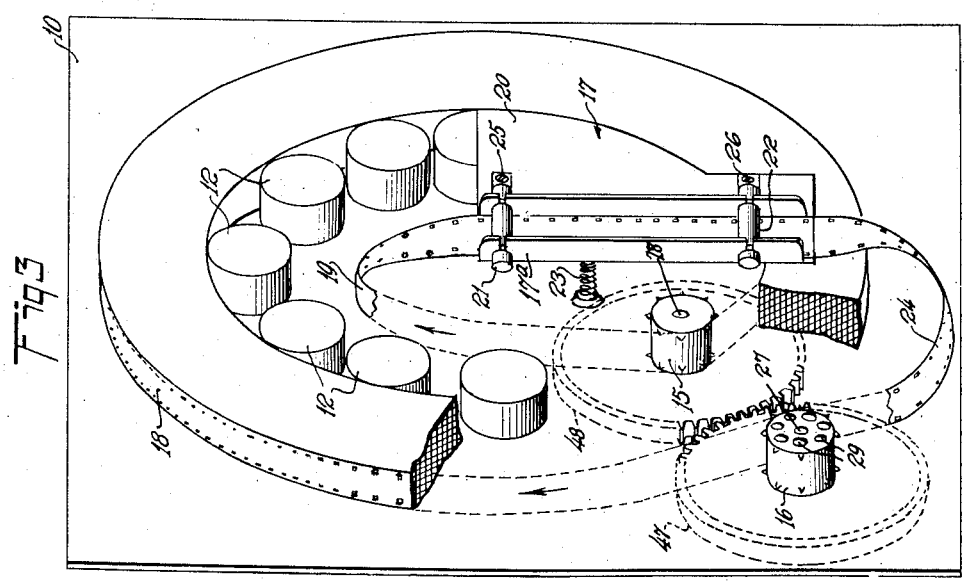
Alfred Duskes
INVENTOR.

April 7, 1942.  A. DUSKES  2,279,022
MOTION PICTURE APPARATUS
Filed Jan. 8, 1940  4 Sheets-Sheet 3
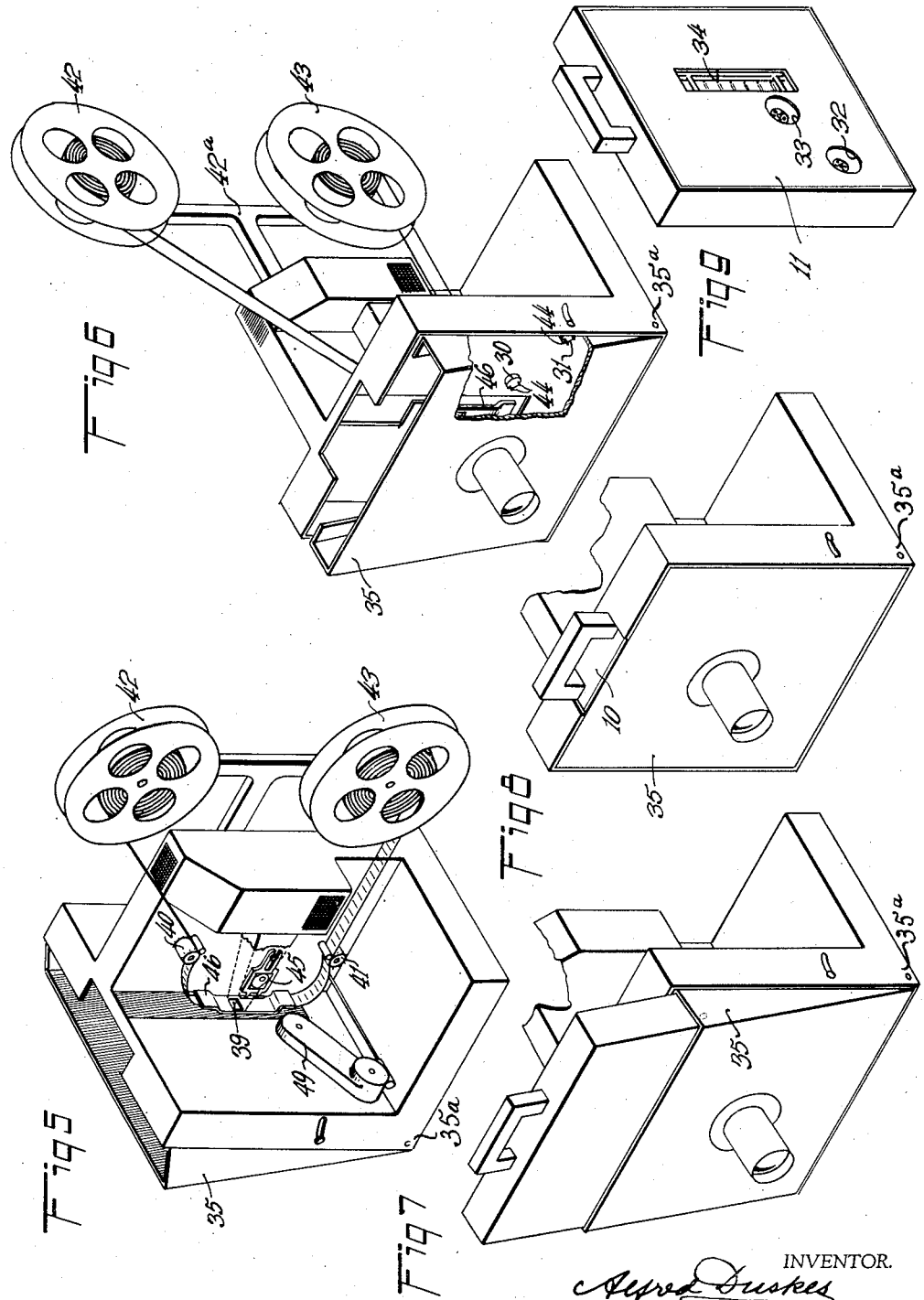
INVENTOR.
Alfred Duskes April 7, 1942.  A. DUSKES  2,279,022
MOTION PICTURE APPARATUS
Filed Jan. 8, 1940   4 Sheets-Sheet 4

Alfred Duskes
INVENTOR.

Patented Apr. 7, 1942

2,279,022

UNITED STATES PATENT OFFICE 2,279,022

MOTION PICTURE APPARATUS

Alfred Duskes, New York, N. Y.

Application January 8, 1940, Serial No. 312,838

9 Claims. (Cl. 88—18.7)

This invention relates to motion picture apparatus and more particularly to motion picture projectors employing endless film bands and interchangeably non-endless films reeled on spools.

For the users of motion picture projectors, especially for the amateur it is an important feature to avoid the difficulties in manipulating the film prior and subsequent to its exhibition, therefore the principal objects of my invention are to eliminate the threading of the film into the projector as also the rewinding of the film between successive exhibits.

Another object of my invention is to provide a motion picture projector with means that enable the use of endless film bands in unitary or self-contained attachable film holders or magazines, that is to say, the use of removable magazines without having to thread the film into the projector, and which is also adapted for the alternate use of non-endless films reeled on spools in the customary way. Thus to provide a motion picture projector permanently in readiness for both purposes without the necessity of attaching or detaching parts thereof when one or the other purpose is to be adapted.

A further object is to provide a removable film magazine for endless film bands with means that prevent the film from being inserted into the film gate of the projector in any other position than the correct one.

Another object is to provide a projector for endless film bands with means to eliminate the pull of the feed-sprockets upon the film when being in a twisted position.

A still further object is to provide a removable film magazine for endless film bands with means that prevent the loose portion of the film from extending outside of the magazine, enabling the film to remain constantly stored in it without being damaged and additionally to remain always pre-threaded and in readiness for exhibition.

Attempts have formerly been made to achieve these objectives but heretofore only part of the manifold objectives have been solved. They were therefore only singularly adaptable for specific purposes, for instance: Prior methods that eliminate the threading of the film into the projector employ non-endless film-coils wound on spools. Therefore for successive exhibits rewinding remained necessary, making these non-threading devices only adaptable to cameras.

On the other hand existing methods that utilize endless film coils and so eliminate rewinding were not applicable to avoid the threading of the film into the projector because of the twists which are formed on its travel from the inner to the outer periphery of the coil. Endless film bands were therefore previously mainly in use in advertising projectors.

Other devices that avoid rewinding have adapted the principle of loading the magazine with two films or one film of double width with laterally adjacent rows of picture frames, progressive in opposite direction. This method is limited to special films of double width and has the further disadvantage of inexpediently compelling the second film or adjacent row of pictures to run idle through the projector when the other one is being projected.

Methods that prevent the strain upon the endless film on its twisted travel from the inner periphery of the coil to the film advancing mechanism and back to the outer periphery of the coil have adapted feeding belts or other frictional driving devices, to lessen the strain, causing the mechanism to be more or less complicated without entirely eliminating the evil. Furthermore heretofore existing projectors that are adaptable for the projection of endless and non-endless films make the attachment or detachment of special devices necessary before the change from one purpose to the other can be effected. They can therefore not be used interchangeably. Besides the remaining disadvantage of having to thread the endless film into the projector, skilled manipulation and time is necessary to change the devices, preventing the use of these projectors for amateur purposes.

I attain all my objectives in one unit without the use of special or double film or the attachment or detachment of special devices by providing the projector, besides some of the usual characteristics with several novel features and by combining the projector with a removable and interchangeable magazine for an endless film band which embodies a novel channel-like film-holding guide and feed sprockets. Said magazine enables the endless film to remain constantly pre-threaded within the interior of the magazine in such a manner that when the magazine is contacted with the complementary projector the mechanism of the projector drives the feed and supply-sprockets and simultaneously engages into the perforation of the film-strip, within the magazine thus enabling single or repeated projection of an endless film without threading or rewinding or any other manipulation than the insertion of the magazine into the proper projector.

The novel pre-threading device arranged within the magazine assures the correct position of the endless film in the film-gate of the projector and also prevents the film from extending outside of the magazine.

The strain on the twisted part of the film is avoided by arranging the film channel holding-guide and the feed sprockets both within the endless film magazine thus eliminating the necessity of pulling the film to and from the projector and thus avoiding the strain.

The double use of the projector for endless film-bands in removable interchangeable magazines as also for non-endless films, without attaching or detaching additional parts, is mainly achieved by providing the projector with a novel magazine receptacle in which the removable magazine can be inserted, with clutches that are adapted to drive the film feed-sprockets within the magazine and additionally with a film gate aperture plate complementary to the channel-guide within the magazine.

It is obvious that my invention is preferably utilized by adapting a magazine for each film-coil in which the film remains permanently stored thus serving as a container to protect the film when not being projected.

It should be understood that features of this invention are applicable to both moving picture projectors and a moving picture camera. Hence, the term, "moving picture apparatus" is herein understood to cover the one as well as the other.

The several features of my invention and other objectives and advantages will be apparent from the following specification and accompanying drawings in which:

Figure 1 is a front view of one form of the removable film-magazine embodying a film coil, feed and supply-sprockets and a film-holding-guide and with the magazine-cover partly broken away to show the interior arrangement. In this view the film is shown in a complete circuit of travel, forming two loops between the sprockets and the film-holding-guide.

Figure 2 is a longitudinal section along the line 2—2d of Fig. 1 illustrating the magazine inserted into the complementary projector.

Figure 3 is a perspective view of Figure 1 illustrating a slightly modified construction of the drive for the two feed-sprockets.

Figure 4 is a longitudinal section of another form of a removable film-magazine according to my invention, in combination with a complementary projector.

Figure 5 is a perspective rear view of the projector shown in Figure 2, with the magazine removed, illustrating the additional arrangement by which the projector also can be used for non-endless film-coils in the customary way with two spools.

Figure 6 is a perspective front view of Figure 5 showing the clutches for the film sprockets of the magazine and the projector in use for non-endless films.

Figure 7 is a perspective front view of Figures 5 and 6 showing the insertion of the magazine.

Figure 8 is a perspective front view of Figure 7 showing the magazine fully inserted and ready for projection.

Figure 9 is a perspective view of Figure 1.

Figure 12:
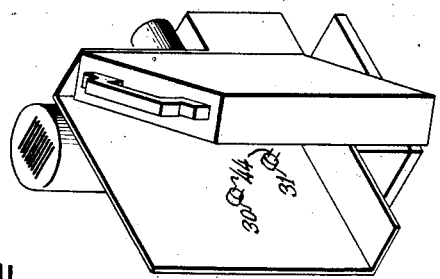
Figures 10 to 13 are perspective views of projectors complementary to the magazine shown in Figure 4, illustrating the application of the magazine.

Referring now more in detail to the drawings I will describe the particular embodiment of the invention used for illustrative purposes.

Like characters of reference relate to like parts throughout the several views. The film magazine Figure 1 comprises mainly a supporting frame-plate 10, a cover 11, a plurality of idle rollers 12, rotatably mounted by means of studs 14 on the supporting frame plate 10, two novel designed film feed sprockets 15 and 16 with the usual sprocket teeth which engage the perforation of the film and a channel-like film-holding device 17. The film-holding device 17 (Figure 3) comprises a base-plate 20 which is mounted on the studs 14a, b and c, (Figure 1) two horizontal location bars 21 and 22 suitably fastened to the base plate 20 at 25 and 26 and a channel-like film guide 17a which is pressed by means of a spring 23 (Figure 3) against the bars 21 and 22.

The intake- and outgo-sprockets 15 and 16 (Figures 1 and 3) of the magazine idly rotatable on the studs 27 and 28 are provided with holes 29 in which the pins 44, (Figure 6), arranged on the clutches 30 and 31 of the projector, engage when the magazine is contacted with the projector. The clutches 30 and 31 are driven by the mechanism of the projector and covered in the rear with a casing 49 (Figure 5).

The gears 47 and 48 (Figure 3) suitably fastened to the sprockets 15 and 16 are designated to drive the sprockets 15 and 16 in a slightly different form to the one illustrated in Figure 1. In the arrangement shown in Figure 1 the two clutches 30 and 31 of the projector are adapted to drive the two sprockets 15 and 16 of the magazine and the gears 47 and 48 are unnecessary. In the arrangement illustrated in Figure 3 the projector is provided with only one clutch designed to drive one sprocket, whereas the gears 47 and 48 connect the two sprockets together to the effect that one sprocket drives the other. The use of the endless film through the travel mechanism of the magazine is best illustrated in Figures 1 and 3. The intake sprocket 15 feeds the film in direction of the arrows from the inner convolution of the coil, whereas the outgo-sprocket 16 feeds the film to the outer circle of the coil. The loose portion of the film, that is the piece between the intake- and outgo-sprockets 15 and 16, is placed into the film channel guide 17, in which said film is held in position between the channel guide 17 and the horizontal location bars 25 and 26 by means of the spring 23 pressing the channel slightly against the two bars. Two slightly twisted loops 19 and 24 (Figures 1 and 3) are formed between the two sprockets 15 and 16 and the channel-guide, to prevent tension on the film. The film is now pre-threaded and after closing the magazine with the cover 11 remains permanently in the magazine ready for single or repeated projection. For projection the magazine is inserted into the magazine-carrier 35 of the projector as shown in Figures 2, 7 and 8. Figure 7 shows the magazine half way inserted, Figure 8 illustrates the magazine fully inserted and contacted with the projector. This causes the clutches 30 and 31 (Figure 6), by means of the pins 44 to engage into the holes 29 of the intake- and outgo-sprockets 15 and 16 connecting the driving mechanism of the projector with the two sprockets. When the projector is set in motion the two sprockets will now rotate in the required direction and speed, being driven by means of the clutches 30 and 31 by the mechanism of the projector. Furthermore the film in the channel guide 17a will now be pressed against the aperture plate 46 of the projector instead of against the location bars 21 and 22 of the magazine to the effect that the intermittent claw-movement 45 (Figures 2 and 5) will operate direct into the perforation of the film, advancing said portion of the film intermittently and in the proportion to the feed and outgo sprockets.

The magazine receptacle 35 (Figures 2, 7 and 8) of the projector is hinged at 35a so that the magazine can only be inserted or removed when the magazine carrier is in an opened position as shown in Figure 7. This arrangement prevents damage to the claws of the pull-down movement 45 (Figure 2) or to the pins 44 (Figure 6) of the clutches 30 and 31. The two retracting pins 44 projecting forwardly on the clutches 30 and 31 are pressed outwardly by means of coil-springs (not shown). The sprockets 15 and 16 are provided with an odd number of holes in which the pins 44 engage. By this arrangement always one of the two retractable pins will engage in one of the holes of the sprockets, whereas the other pin, being situated between two holes of the sprocket will retract into the clutch.

Figure 14:
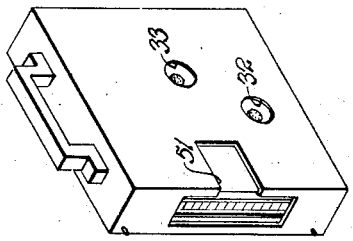
Figure 14 is a perspective view of the magazine illustrated in Figure 4.
Figure 10:
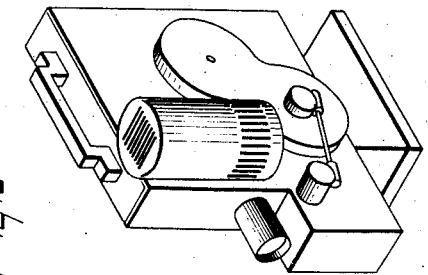
Figure 13:
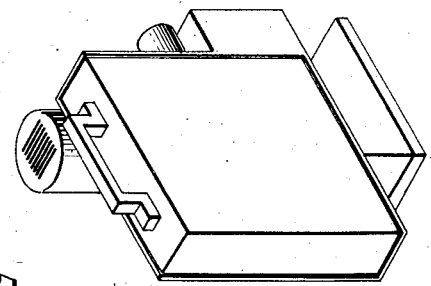

To exhibit non-endless films in the customary manner with the same projecting machine, said projector (Figures 5 and 6) is provided with two additional sprockets 40 and 41, a feed-spool bracket 42a (Figure 6) with spool 42, an ordinary take-up spooling device (not shown) with spool 43 and an extra film-pressure door 37 (Figure 2). The film sprockets 40 and 41 are designed to feed the film to and from the aperture gate 46 and from and to the spools 42 and 43 in the usual way. The film pressure door 37 (Figure 2) when closed against the aperture plate 46 holds and presses the film slightly against said aperture plate. The magazine carrier 35 remains empty and locked against the projector when in use for non-endless films as shown in Figure 8. The arrangement of the projector lamp and lens can easily be understood in the illustrations shown. The non-endless film has to be removed from the projector when the endless film coil within the magazine is to be projected. Figures 10 to 14 illustrate a different form of my invention adapting the form of magazine illustrated in Figure 4. The light of the projector lamp is focused on to the film frame by means of a prism 50 (Figure 15) through an opening 51 in the magazine (Figure 14).

Figure 15:
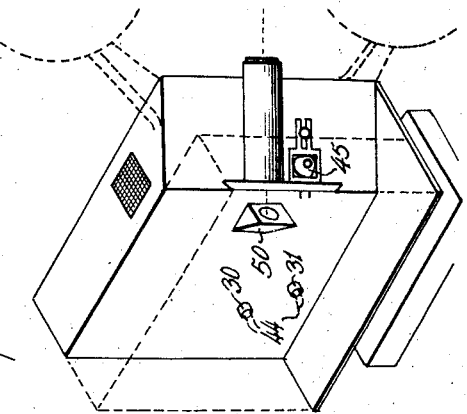
Figure 15 represents another form of the projector of slightly different arrangement.
Figure 11:
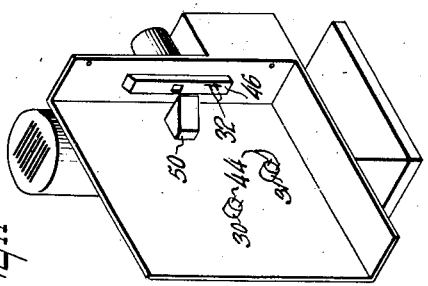

Figure 15 illustrates another slightly different form of arrangement showing the aperture plate 46 for the film channel holding device in a differently arranged degree of angle.

While the above description refers to a motion picture projector having a pin-claw intermittent film advancing movement, it should be noted that other types of mechanical or optical film advancing movements may be employed. The same applies to the shape of the endless film coil. According to the above description the coil is reeled around rotatably arranged idle rollers. Any other endless reeling device for instance with rollers that are arranged to form an oblong or other shape or in which the rollers are more or less driven by mechanical or other means instead of idling may be adapted. Furthermore the channel film-holding device as shown in the drawings can vary in construction or be arranged in different positions or degrees of angle within the magazine and the means by which the film is held in a pre-threaded position within the film holding device may vary. Any suitable mechanical means to hold the film in the desired position within the channel holding device may be adapted. The horizontal location bars against which the film is being pressed by the channel-guide may be differently formed or arranged and the means by which the channel is pressed against the bars may differ. Also any construction or suitable form of clutch for imparting rotation to the feed-sprockets of the magazine may be provided. The construction, arrangement or position of the magazine in the projector may differ in many ways. For instance the magazine-receptacle may be slideably contacted with the projector and the magazines instead of being inserted from above or sideways into the magazine-receptacle, as preferably chosen in the illustration, may be inserted or contacted in any other position or direction. The accompanying illustrations have already shown that various arrangements are readily applicable by those skilled in the art and that this may be done without departing from the spirit of my invention. The above disclosure is therefore only to be construed in an illustrative and not limiting sense. The scope of the invention being defined by the following claims.

I claim:

1. Motion picture projecting apparatus for endless film, comprising a projector having optical projecting means, a film guiding aperture plate associated with said optical means for positioning the film with respect thereto, and also having film feed drive mechanism, and driving clutch means, and an endless film magazine, means to removably connect said magazine to said projector, said magazine comprising a supporting frame, means for rotatably supporting a roll of endless film on said frame, a feed sprocket mounted on said frame and disposed inside the inner diameter of said film roll, a take-up sprocket outside of said roll and also mounted on said frame, film guide means complementary to said aperture plate, said guide means comprising a pressure member, means for mounting the pressure member on said frame for yieldably pressing the film against said aperture plate, stop means for said pressure member, connected with said frame to provide a path for the film and to provide with said pressure member a film guiding and holding means, said inside sprocket being adapted to feed the film directly to said film guide means, and complementary clutch means to establish driving engagement between said film feed drive clutch means and said sprockets incident to the attachment of the magazine to the projector, said film guide means on the magazine being positioned to enter into cooperative association with the aperture plate to confine the film between them, so as to effect self-threading of the film with respect to the projector incident to such attachment.

2. Apparatus according to claim 1, in which the means for mounting the pressure member on said frame comprise a support, and said stop means are provided on said support.

3. Apparatus according to claim 1, having means whereby said guide means are connected with the frame, so that said guide means are disposed laterally of the film roll.

4. Apparatus according to claim 1, having means whereby said guide means are connected to said roll supporting means, so that said guide means are disposed laterally of the film roll.

5. Apparatus according to claim 1, with the addition of means to permit optional use of endless or nonendless film with the projector, which means comprise an additional film guide member movably mounted on said projector and complementary to said aperture plate, said additional film guide member being engageable to guide nonendless film between it and the aperture plate, and displaceable to an out-of-the-way position, to permit the use of said endless film magazine.

6. For use with a motion picture projector having optical projecting means, a film guiding aperture plate associated with said optical means for positioning the film with respect thereto and also having film feed drive mechanism, and driving clutch means, an endless film magazine, means to removably connect said magazine to said projector, said magazine comprising a supporting frame, means for rotatably supporting a roll of endless film on said film, a feed sprocket mounted on said frame and disposed inside the inner diameter of said film roll, a take-up sprocket outside of said roll and also mounted on said frame, film guide means complementary to said aperture plate, said guide means comprising a pressure member, means for mounting the pressure member on said frame for yieldably pressing the film against said aperture plate, stop means for said pressure member connected with said frame to provide a path for the film and to provide with said pressure member a film guiding and holding means, said inside sprocket being adapted to feed the film directly to said film guide means, and complementary clutch means adapted to establish driving engagement between said film feed drive clutch means and said sprockets incident to the attachment of the magazine to the projector, said film guide means on the magazine being positioned to enter into cooperative association with the aperture plate to confine the film between them, so as to make possible self-threading of the film with respect to the projector incident to such attachment.

7. Apparatus according to claim 6, in which the means for mounting the pressure member on said frame comprise a support, and said stop means are provided on said support.

8. Apparatus according to claim 6, having means whereby said guide means are connected with the frame, so that said guide means are disposed laterally of the film roll.

9. Apparatus according to claim 6, having means whereby said guide means are connected to said roll supporting means, so that said guide means are disposed laterally of the film roll.

ALFRED DUSKES.